United States Patent
Zivcec et al.

(10) Patent No.: US 11,155,003 B2
(45) Date of Patent: Oct. 26, 2021

(54) METHOD FOR PRODUCING A GREEN BODY LAYER BY LAYER FROM PULVEROUS MATERIAL BY MEANS OF INSERT ELEMENTS ARRANGED IN A DEFINED MANNER

(71) Applicant: Hilti Aktiengesellschaft, Schaan (LI)

(72) Inventors: Maria Zivcec, Buchs (CH); Robert Spring, Fruemsen (CH); Roland Schneider, Schlins (AT)

(73) Assignee: Hilti Aktiengesellschaft, Schaan (LI)

( * ) Notice: Subject to any disclaimer, the term of this patent is extended or adjusted under 35 U.S.C. 154(b) by 196 days.

(21) Appl. No.: 16/471,651

(22) PCT Filed: Nov. 29, 2017

(86) PCT No.: PCT/EP2017/080787
§ 371 (c)(1),
(2) Date: Jun. 20, 2019

(87) PCT Pub. No.: WO2018/114256
PCT Pub. Date: Jun. 28, 2018

(65) Prior Publication Data
US 2020/0122354 A1    Apr. 23, 2020

(30) Foreign Application Priority Data
Dec. 22, 2016  (EP) .................................. 16206212

(51) Int. Cl.
*B28B 1/00*   (2006.01)
*B33Y 10/00*  (2015.01)
(Continued)

(52) U.S. Cl.
CPC .............. *B28B 1/001* (2013.01); *B22F 10/14* (2021.01); *B28B 1/008* (2013.01); *B28B 23/00* (2013.01); *B29C 64/165* (2017.08); *B33Y 10/00* (2014.12)

(58) Field of Classification Search
CPC ..... B28B 1/001; B29C 64/165; B29C 64/106; B22F 10/14
See application file for complete search history.

(56) References Cited

U.S. PATENT DOCUMENTS

2014/0284830 A1   9/2014  Fromm
2015/0037498 A1   2/2015  Bruck et al.

FOREIGN PATENT DOCUMENTS

DE   102011113163       3/2013
EP   0 452 618 A1      10/1991
(Continued)

OTHER PUBLICATIONS

International Search Report of PCT/EP2017/080787, dated May 2, 2018.

*Primary Examiner* — Mary Lynn F Theisen
(74) *Attorney, Agent, or Firm* — Davidson, Davidson & Kappel, LLC

(57) ABSTRACT

A method for the layered production of a green body (10) from powdery material, including insert elements which are placed at defined positions in the powdery material, in which the green body (10) is segmented in a building direction (16) into N, N≥2 consecutive, cylindrical cross-sectional areas (11, 12, 13, 14, 15) made up of a two-dimensional cross-sectional surface and a layer thickness. Setting areas for the insert elements are defined in the cross-sectional areas of the green body (10) which include the defined positions for the insert elements, and loose powder particles surrounding the setting elements are at least partially bonded to each other (Continued)

before the insert elements are placed into the powdery material.

11 Claims, 7 Drawing Sheets

(51) Int. Cl.
*B29C 64/165* (2017.01)
*B22F 10/14* (2021.01)
*B28B 23/00* (2006.01)

(56) References Cited

FOREIGN PATENT DOCUMENTS

| EP | 2947274 | 11/2015 |
|----|---------|---------|
| JP | 2000190086 A | 7/2000 |
| WO | WO2013030064 | 3/2013 |

METHOD FOR PRODUCING A GREEN BODY LAYER BY LAYER FROM PULVEROUS MATERIAL BY MEANS OF INSERT ELEMENTS ARRANGED IN A DEFINED MANNER

The present invention relates to a method for the layered production of a green body from powdery material including insert elements arranged in a defined.

BACKGROUND

Abrasive processing tools, such as drill bits, saw blades, cutting wheels or grinding wheels, include processing segments which are fastened to a tubular or disk-shaped base body. Depending on the processing method of the abrasive processing tool, the processing segments are referred to as drilling segments, sawing segments, cutting segments or grinding segments and combined under the term "processing segments". The processing segments are constructed from a powdery material and cutting elements in the form of hard material particles. A distinction is made between processing segments having statistically distributed hard material particles and processing segments having hard material particles arranged in a defined manner. In processing segments having statistically distributed hard material particles, the powdery material and the hard material particles are mixed and filled into a suitable tool mold and initially formed into a green body with the aid of cold pressing. In processing segments having hard material particles arranged in a defined manner, the green body is constructed in layers from a powdery material, into which the hard material particles are placed in defined positions. In the case of statistically distributed hard material particles and hard material particles arranged in a defined manner, the green bodies are compressed into usable processing segments by hot pressing and/or sintering.

Processing segments having statistically distributed hard material particles have multiple disadvantages. Since the hard material particles are also arranged on the surface of the green bodies, the tool molds needed for cold pressing the green bodies have a high degree of wear. In addition, the distribution of the hard material particles in the green body does not correspond to the optimal distribution for application purposes. The disadvantages of processing segments having statistically distributed hard material particles result in that processing segments having hard material particles arranged in a defined manner are overwhelmingly used for high quality processing tools, despite the higher costs.

EP 0 452 618 A1 describes a known method for the layered production of a green body from a powdery material, including hard material particles in defined positions in the powdery material. The known method is based on three-dimensional data of the green body and includes the following method steps:

The green body is segmented in a building direction into N, N≥2 consecutive cylindrical cross-sectional areas, each cross-sectional area being formed from a two-dimensional cross-sectional surface perpendicular to the building direction and a layer thickness in parallel to the building direction;

N, N≥2 powder layers of the powdery material are applied to a building plane, which is situated perpendicularly to the building direction.

The hard material particles are situated in the defined positions in the powdery material.

The hard material particles are taken up with the aid of a suction plate and positioned over the layer structure. By reducing the suction force or with the aid of a short compressed air blast, the hard material particles detach from the suction plate and are placed into the upper powder layer of the layer structure. The compressed air blast may be only so strong that the powdery material is not displaced and the hard material particles are situated in the provided defined positions of the distribution. Another disadvantage is that the hard material particles are situated only loosely on or in the upper powder layer. Upon applying and distributing the next powder layer of the powdery material with the aid of an application tool in the form of a roller, a scraper or a brush, the hard material particles may be displaced from their defined positions by the application tool, and the accuracy may thus be reduced.

SUMMARY OF THE INVENTION

It is an object of the present invention to increase the accuracy with which the provided distribution of the insert element in the green body is formed in the layered production of green bodies, which are compressed, in particular into processing segments for abrasive processing tools. The provided distribution of the insert elements in the green body are also to be maintained during the further layered production of the green body. At the same time, the production complexity is to be as low as possible in the green body for the accuracy and the share of undesirable additional constituents, for example in the form of an adhesive or binding agent.

In the method mentioned at the outset for the layered production of a green body from a powdery material having insert elements arranged in a defined manner.

The present invention provides a method for the layered production of a green body from powdery material, which includes insert elements arranged in defined positions in the powdery material. Setting areas for the insert elements are defined in the cross-sectional areas of the green body which include the defined position of the insert elements, and loose powder particles, which surround the setting areas, are at least partially bonded to each other before the insert elements are placed into the powdery material. The bonded powder particles form support structures for the insert elements. The insert elements are placed into the support structures, which prevent the insert elements from being displaced upon the application of another powder layer of the powdery material, so that the defined positions of the insert elements may be maintained during the layer construction with a high degree of accuracy.

Green bodies manufactured in layers with the aid of the method according to the present invention are made up of multiple consecutive, cylindrical cross-sectional areas in the building direction, which include a two-dimensional cross-sectional surface perpendicular to the building direction and a layer thickness in parallel to the building direction, the cross-sectional areas being formed as straight cylinders including an arbitrary cross-sectional surface. The insert elements are arranged in a three-dimensional distribution in the green body, the positions of the insert elements being calculated with regard to a good cutting performance and referred to as defined positions. One setting volume, into which the insert element is placed, is provided for each insert element in the green body. Like the green body, the setting volumes for the insert elements are segmented into consecutive areas, which are referred to below as setting areas. Depending on the height of the setting volumes, the setting volumes may be made up of one setting area or multiple consecutive setting areas in the building direction. The number of consecutive setting areas is dependent on the layer thicknesses of the cross-sectional areas and the dimensions of the insert elements, in particular the height in the building direction.

The method according to the present invention for the layered production of a green body is characterized in that support structures are created in the green body before the insert elements are placed, which at least partially surround the setting areas for the insert elements in the building plane. Upon the application of the powder layers, the powdery material is made up of loose powder particles, which do not form a bond with each other and may be displaced with respect to each other. The support structures for the insert elements are created in that loose powder particles in the powdery material are bonded to each other and ensure that the insert elements are not displaced upon the application of another powder layer of the powdery material and may retain their positions during the layer construction. Due to the fact that the powder particles of the powdery material are bonded only around the setting areas, the share of undesirable additional constituents, for example in the form of an adhesive or binding agent, may be limited. Undesirable additional constituents in the green body must be removed in a compression process with the aid of hot pressing and/or sintering. If the additional constituents cannot be completely removed, the quality of the compressed component may suffer.

The support structures have a closed or non-closed cross-sectional shape and are designed, for example, in the shape of a ring or ring segment having a ring width and a ring height. The cross section of the ring shape or ring segment shape is designed, for example, as a circular ring or circular ring segment or as a multi-part ring or multi-part ring segment. The ring or ring segment shape is advantageously adapted to the geometry of the insert elements. The ring width and the ring height are designed in such a way that the support structures are fixed in the powdery material. In many methods for the layered production of green bodies, the powdery material is applied with the aid of a tool in the form of a roller, a doctor knife or a brush, the tool being moved in a feed direction over the layer structure. The tool is moved over the powdery material in a single-pass feed movement or in a two-pass feed movement. In a single-pass feed movement, it may be sufficient if the support ring is designed as a support wall on the far side; in a two-pass feed movement (back-and-forth movement), support walls must be formed on opposite sides.

The method according to the present invention for the layered production of a green body is suitable for powdery materials, which are also referred to as material powder. All materials which are solid in the initial state and are made from loose, i.e. non-bonded, powder particles, are combined under the term "powdery materials". Powdery materials may be made up of a material powder or be composed of a mixture of different material powders. All elements, which may be integrated into a component, are combined under the term "insert elements." This includes, among other things, cutting elements, sensor elements, material fillings and placeholder elements. All cutting means for abrasive processing segments are combined under the term "cutting element." This includes, in particular, individual hard material particles (particles of hard materials), composite parts made up of multiple hard material particles and coated or encapsulated hard material particles. Hard materials are characterized by a special hardness. Hard materials may be divided into natural and synthetic hard materials, on the one hand, and into metallic and nonmetallic hard materials, on the other hand. The natural hard materials include, among other things, natural diamonds, corundum and other hard minerals, and the synthetic hard materials include, among other things, synthetic diamonds, high-melting carbides, borides, nitrides and silicides. The metallic hard materials include, among other things, the high-melting carbides, borides, nitrides and silicides of the transition metals of the fourth through the sixth group of the periodic system, and the nonmetallic hard materials include, among other things, diamond, corundum, other hard minerals, silicon carbide and boron carbide The loose powder particles surrounding the setting areas for the insert elements are preferably bonded to each other in a closed support structure. A support structure is referred to as closed if the support structure has a closed circumference in the building plane, and the setting area is completely surrounded by the support structure. The insert elements are placed into the support structure, which prevents the insert elements from being displaced upon the application of another powder layer of the powdery material, so that the positions of the insert elements may be maintained during the layer construction with a high degree of accuracy. The formation of closed support structures is useful in methods for the production of green bodies, in which the powdery material is applied in different feed directions. In addition, the stability of closed support structures is greater than that of support structures having an open circumference.

Alternatively, the loose powder particles surrounding the setting areas for the insert elements are bonded to each other in a non-closed support structure. A support structure is referred to as non-closed if the support structure has an open circumference in the building plane, and the setting area is not completely surrounded by the support structure. The insert elements are placed into the non-closed support structure, which prevents the insert elements from being displaced upon the application of another layer of the powdery material. In non-closed support structures, the production complexity during creation and the share of additional constituents are reduced, compared to closed support structures.

In one particularly preferred embodiment, the non-closed support structure includes multiple support sections, the support sections being arranged around the insert elements. Multiple support sections surrounding the insert elements have the advantage that the insert elements are not displaced during the application of another powder layer of the powdery material, and the positions of the insert elements may be maintained with a high degree of accuracy during the layer construction. Due to the use of a non-closed support structure, the production complexity during creation and the share of additional constituents are reduced, compared to closed support structures.

In an alternative, particularly preferred embodiment, the non-closed support structure includes at least one support section, the support section being arranged on a side of the insert elements facing away from the application direction of the next powder layer. Due to the use of non-closed support structures including a support section, the production complexity during creation and the share of additional constituents may be further reduced. The support section is placed in such a way that the insert element is secured by the support section against displacement upon the application of the next powder layer. For this purpose, the support section is arranged on the side of the insert elements which faces away from the application direction of the next powder layer.

Green bodies manufactured with the aid of the method according to the present invention for the layered production are constructed in the building direction from N, N ≥ 2 cylindrical cross-sectional areas, which are made up of the cross-sectional surface perpendicular to the building direction and the layer thickness in parallel to the building direction. Each cross-sectional area includes at least one outer cylindrical lateral surface, which is also referred to as the outer lateral surface. In green bodies having inner recesses, the cross-sectional areas additionally include one or multiple inner cylindrical lateral surfaces, which are also referred to as inner lateral surfaces. Limiting rings are defined for the outer and inner lateral surfaces of the green body, the limiting rings of the outer lateral surfaces being referred to as outer limiting rings or outer rings, and the limiting rings of the inner lateral surfaces being referred to as inner limiting rings or inner rings. "Outer limiting rings" as well as "inner limiting rings" are combined under the term "limiting ring". The outer limiting rings have outer geometries which correspond to the outer lateral surfaces of the cross-sectional areas, and the inner limiting rings have inner geometries which correspond to the inner lateral surfaces of the cross-sectional areas. The layer thicknesses of the cross-sectional areas define the heights of the limiting rings.

In a first variant of the method, a base element is defined for the first cross-sectional area, which includes a base surface corresponding to the first cross-sectional surface of the first cross-sectional area and a height corresponding to the first layer thickness of the first cross-sectional area, and the loose powder particles of the powdery material are bonded to each other in the base element. Green bodies manufactured in layers with the aid of the method according to the present invention are subjected to a compression process after the layer construction. For this purpose, the green bodies must be removed from the surrounding powdery material without powdery material emerging from the green body. The bonded powder particles of the base element form a base for the green body and prevent the powdery material from emerging from the base surface.

In a second variant of the method, a first limiting ring is defined for each cylindrical lateral surface of the first cross-sectional area, which has a geometry corresponding to the cylindrical lateral surface of the first cross-sectional area and a height corresponding to the first layer thickness of the first cross-sectional area; the first powder layer of the powdery material is applied to a substrate, and the first limiting rings are connected to the substrate. If the green body is constructed on a substrate according to the second variant of the method, the substrate forms a base for the green body and prevents an emergence of the powdery material. Thin metal plates, for example, are used as the substrate.

The support structures are particularly preferably connected to the base element or to the substrate. In support structures connected to the base element or the substrate, the risk is reduced that the support structures are displaced during the application of another powder layer of the powdery material by the application tool.

For each cylindrical lateral surface of the second to Nth−1 cross-sectional area, a second to Nth−1 limiting ring is defined, which has a geometry corresponding to the cylindrical lateral surface of the second to Nth−1 cross-sectional area and a height corresponding to the layer thickness of the second to Nth−1 cross-sectional area. Green bodies manufactured in layers with the aid of the method according to the present invention are made up of multiple consecutive, cylindrical cross-sectional areas, which include a cross-sectional surface perpendicular to the building direction and a layer thickness in parallel to the building direction. The powdery material of the green body may be separated from the surrounding powdery material with the aid of the second to Nth−1 limiting rings. Each second to Nth−1 cross-sectional area includes an outer cylindrical lateral surface. In green bodies having inner recesses, the second to Nth−1 cross-sectional areas additionally include one or multiple inner cylindrical lateral surfaces. A second to Nth−1 limiting ring having a geometry and a height are defined for the outer lateral surface and each inner lateral surface of the green body.

The loose powder particles of the second to Nth−1 limiting rings are particularly preferably bonded to each other, and the second to Nth−1 limiting rings are each connected to the underlying base element or the underlying first to Nth−2 limiting rings. The limiting rings of the cross-sectional areas separate the green body from the surrounding powdery material. A closed outer geometry may be created by connecting the limiting rings arranged one above the other.

In a first variant, an Nth limiting ring is defined for each cylindrical lateral surface of the Nth cross-sectional area, which has a geometry corresponding to the cylindrical lateral surface of the Nth cross-sectional area and a height corresponding to the Nth layer thickness of the Nth cross-sectional area; the loose powder particles of the Nth limiting rings are bonded to each other, and the Nth limiting rings are connected to the underlying Nth−1 limiting rings. The powdery material of the green body may be separated from the surrounding powdery material with the aid of the Nth limiting rings. To prevent the powdery material from emerging from the green body, the loose powder particles of the Nth limiting rings are bonded to each other, and the Nth limiting rings are connected to the underlying Nth−1 limiting rings.

In a second variant, a cover element is defined for the Nth cross-sectional area, which includes a cover surface corresponding to the Nth cross-sectional surface of the Nth cross-sectional area and a height corresponding to the Nth layer thickness of the Nth cross-sectional area; the loose powder particles of the powdery material in the cover element are bonded to each other, and the cover element is connected to the underlying Nth−1 limiting rings. If the green body is constructed according to the second variant of the method, the Nth cross-sectional area forms a cover element for the green body and prevents an emergence of the powdery material. For this purpose, the loose powder particles of the Nth cross-sectional area are bonded to each other, and the cover element is connected to the underlying Nth−1 limiting rings. The second variant has the advantage that the green body is closed on all sides, so that no powdery material may emerge from the green body.

BRIEF DESCRIPTION OF THE DRAWINGS

Exemplary embodiments of the present invention are described below on the basis of the drawing. The latter is not necessarily intended to represent the exemplary embodiments true to scale but rather the drawing is presented in a schematic and/or slightly distorted form where useful for the purpose of explanation. It should be taken into account that a variety of modifications and changes relating to the form and detail of a specific embodiment may be undertaken without deviating from the general idea of the present invention. The general idea of the present invention is not limited to the exact form or the detail of the preferred specific embodiment illustrated and described below, nor is it limited to an object which would be limited in comparison to the object claimed in the claims. In given design areas, values within the specified limits are also to be disclosed as limiting values and be able to be arbitrarily used and claimed. For the sake of simplicity, the same reference numerals are used below for identical or similar parts or for parts having identical or similar functions.

DETAILED DESCRIPTION

Figure 1:
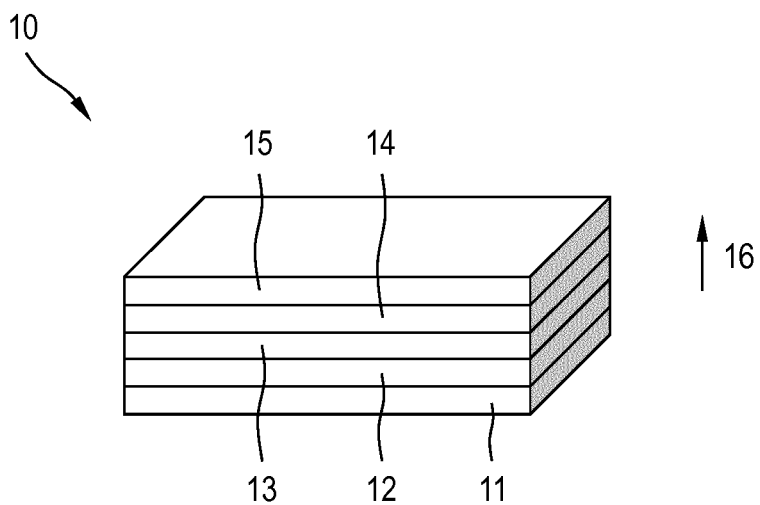
FIG. 1 shows a first green body, which is manufactured from five cylindrical cross-sectional areas arranged one above the other in a building direction with the aid of the method according to the present invention for the layered production.

FIG. 1 shows a green body 10 designed as a cuboid, which is manufactured with the aid of the method according to the present invention for the layered production of a green body from powdery material, including insert elements arranged in a defined manner, and which is referred to below as first green body 10. First green body 10 is manufactured in a layer structure from five cylindrical cross-sectional areas 11, 12, 13, 14, 15 arranged one above the other, which are stacked on top of each other in a building direction 16. Cylindrical cross-sectional areas 11 through 15 have a layer thickness $d_i$, i=1 through 5 in parallel to building direction 16 and a cross-sectional surface perpendicular to building direction 16. Layer thicknesses $d_i$, i=1 through 5 may be uniform, or individual cross-sectional areas 11 through 15 have different layer thicknesses.

Figure 2A:
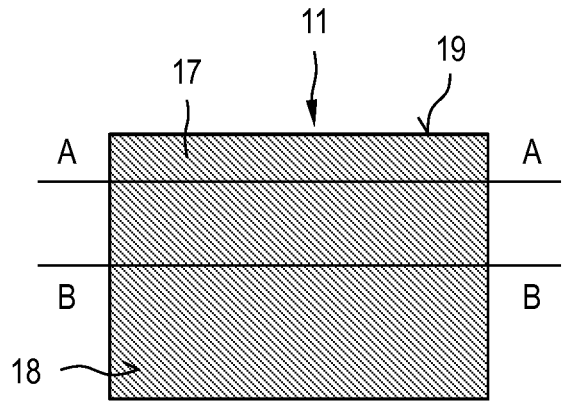
FIGS. 2A through 2E show the five cross-sectional areas of the first green body from FIG. 1, which are made up of a two-dimensional cross-sectional surface perpendicular to the building direction and a layer thickness in parallel to the building direction.
Figure 2B:
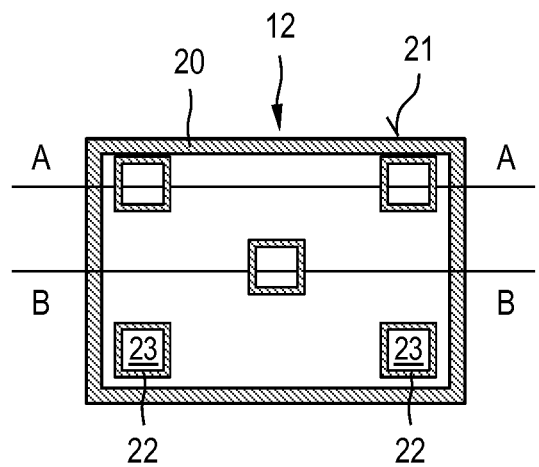
Figure 2C:
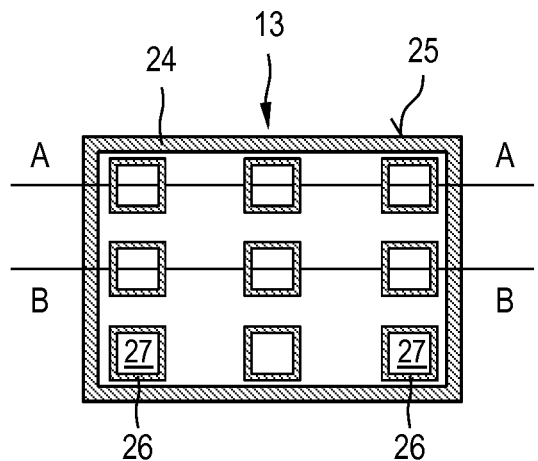
Figure 2D:
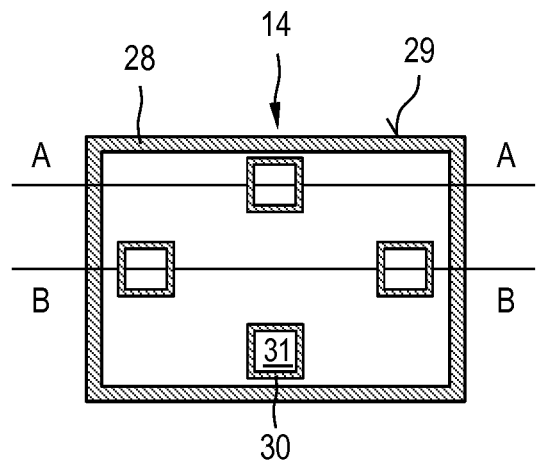
Figure 2E:
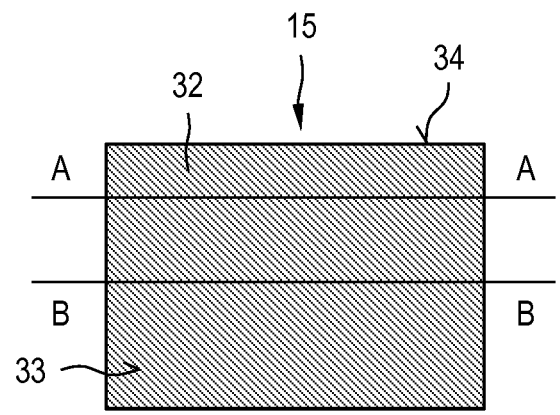

To be able to manufacture first green body 10 in the layer structure, cuboid 10 is segmented in building direction 16 into five cylindrical cross-sectional areas 11 through 15, which are illustrated in FIGS. 2A through 2E. FIG. 2A shows first cross-sectional area 11, FIG. 2B shows second cross-sectional area 12, FIG. 2C shows third cross-sectional area 13, FIG. 2D shows fourth cross-sectional area 14, and FIG. 2E shows fifth cross-sectional area 15.

First cross-sectional area 11 forms a base element 17, which includes a base surface 18 corresponding to the first cross-sectional surface of first cross-sectional area 11, and a first outer lateral surface 19. Second cross-sectional area 12 includes a second outer ring 20 having a second outer lateral surface 21 and five second support rings 22, which surround second setting areas 23. Third cross-sectional area 13 includes a third outer ring 24 having a third outer lateral surface 25 and nine third support rings 26, which surround third setting areas 27. Fourth cross-sectional area 14 includes a fourth outer ring 28 having a fourth outer lateral surface 29 and four fourth support rings 30, which surround fourth setting areas 31. Fifth cross-sectional area 15 forms a cover element 32, which includes a cover surface 33 corresponding to the fifth cross-sectional surface of fifth cross-sectional area 15, and a fifth outer lateral surface 34.

For distinguishing purposes, outer rings 20, 24, 28 are referred to as ith outer rings, and support rings 22, 26, 30 are referred to as ith support rings. Outer rings 20, 24, 28 have an outer geometry corresponding to outer lateral surface 21, 26, 29 of particular cross-sectional area 12, 13, 14 and a height corresponding to layer thickness $d_2$, $d_3$, $d_4$ of particular cross-sectional area 12, 13, 14. Outer rings 20, 24, 28 are designed in the form of a rectangular cylinder and separate first green body 10 from the surrounding powdery material. In the exemplary embodiment, setting areas 23, 27, 31 have a square design and are surrounded by square support rings 22, 26, 30. Instead of closed square support rings 22, 26, 30, other closed cross-sectional shapes or non-closed cross-sectional shapes may be used for the support rings.

Figure 3A:
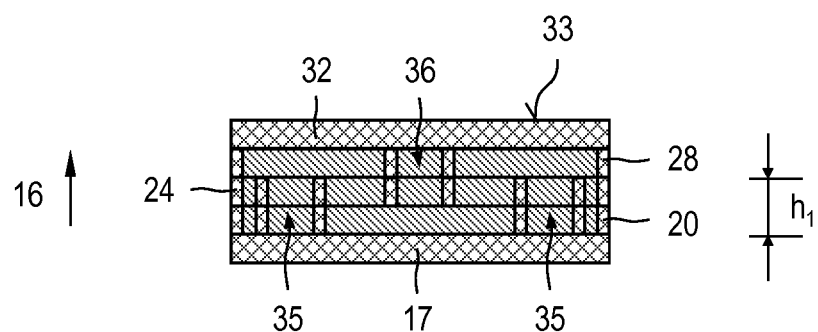
FIGS. 3A, 3B show a first and a second cross section of the first green body from FIG. 1 in parallel to the building direction along section planes A-A in FIGS. 2A through 2E (FIG. 3A) and along section planes B-B in FIGS. 2A through 2E (FIG. 3B)
Figure 3B:
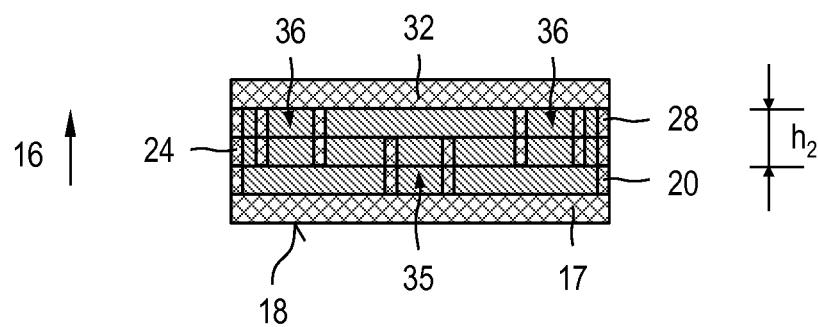

FIGS. 3A, 3B show a first and a second cross section of first green body 10 from FIG. 1 in parallel to building direction 16 along section planes A-A in FIGS. 2A through 2E (FIG. 3A) and along section planes B-B in FIGS. 2A through 2E (FIG. 3B). Five cylindrical cross-sectional areas 11 through 15 of first green body 10 are arranged one above the other in building direction 16.

During the layer construction of first green body 10, a closed outer geometry is created, which prevents an emergence of powdery material from first green body 10. The closed outer geometry of first green body 10 is formed by base element 17, outer rings 20, 24, 28 and cover element 32. The powdery material of first green body 10 may be separated from the surrounding powdery material with the aid of outer rings 20, 24, 28. Base element 17 is connected to second outer ring 20, second outer ring 20 is connected to third outer ring 24, third outer ring 24 is connected to fourth outer ring 28, and fourth outer ring 28 is connected to cover element 32.

Five first support structures 35 are constructed in second and third cross-sectional areas 12, 13, and four second support structures 36 are constructed in third and fourth cross-sectional areas 13, 14. First support structures 35 are formed by second support rings 19 and third support rings 22 arranged thereabove, and second support structures 36 are formed by fourth support rings 24 and third support rings 22 arranged thereunder. First support structures 35 have a first insert height $h_1$, and second support structures 36 have a second insert height $h_2$. FIG. 3A shows two first support structures 35 and one second support structure 36, and FIG. 3B shows one first support structure 35 and two second support structures 36.

In the exemplary embodiment of first green body 10, first and second support structures 35, 36 have the same cross-sectional shape and the same insert height. Alternatively, first support structures 35 may have a first cross-sectional shape and a first insert height $h_1$, and second support structures 36 may have a second cross-sectional shape and a second insert height $h_2$, which are different from each other. Different cross-sectional shapes for the first and second support structures are useful, for example, if different first and second insert elements are arranged in the support structures.

FIGS. 4A through 4M show the consecutive method steps of the method according to the present invention for the layered production of first green body 10 of FIG. 1 from powdery material 41, including insert elements 42 arranged in a defined manner. First green body 10 is compressed into a processing segment for an abrasive processing tool in a subsequent compression process, for example by hot pressing and/or sintering. Green body 10 is manufactured from powdery material 41 and insert elements in the form of cutting elements, which are designed as individual hard material particles 42. Hard material particles 42 originate from a mixture of hard material particles, which are characterized by a minimum diameter $D_{min}$ and a maximum diameter $D_{max}$, 95% of the hard material particles being larger than minimum diameter $D_{min}$ and smaller than maximum diameter $D_{max}$.

Figure 4A:
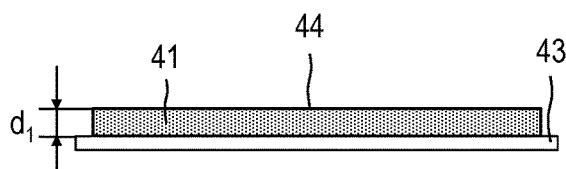
FIGS. 4A through 4M show the consecutive method steps of the method according to the present invention for the layered production of the first green body from FIG. 1, including hard material particles arranged in a defined manner.
Figure 4B:
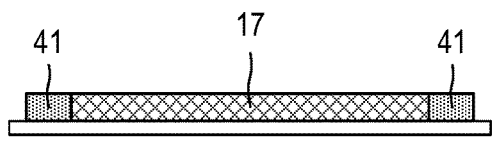

First green body 10 is manufactured in layers with the aid of a device, which includes a building plane 43, a powder feed unit and a print head. A first powder layer 44 of powdery material 41 having first layer thickness $d_1$ is applied with the aid of the powder feed unit (FIG. 4A). The print head applies an adhesive layer in first cross-sectional area 11, which bonds the loose particles of powdery material 41 to base element 17; loose powder particles of powdery material 41 are situated outside base element 17 (FIG. 4B).

Figure 4C:
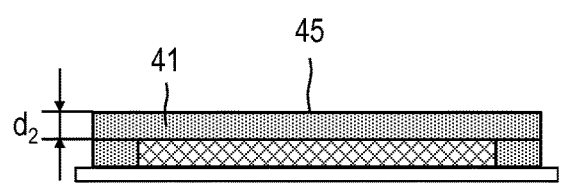
Figure 4D:
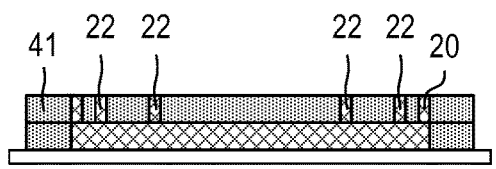
Figure 4E:
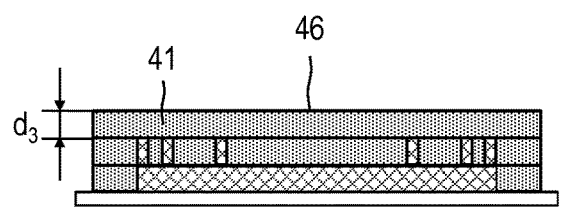
Figure 4F:
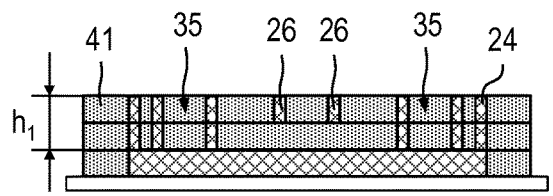

A second powder layer 45 of powdery material 41 having second layer thickness $d_2$ is applied with the aid of the powder feed unit (FIG. 4C). In the area of second outer ring 20 and second support rings 22, the print head applies adhesive, which bonds the loose powder particles of powdery material 41 to second outer ring 20 and second support rings 22 (FIG. 4D). A third powder layer 46 of powdery material 41 having third layer thickness $d_3$ is applied with the aid of the powder feed unit (FIG. 4E). In the area of third outer ring 24 and third support rings 26, the print head applies adhesive, which bonds the loose powder particles of powdery material 41 to third outer ring 24 and third support rings 26 (FIG. 4F).

Figure 4G:
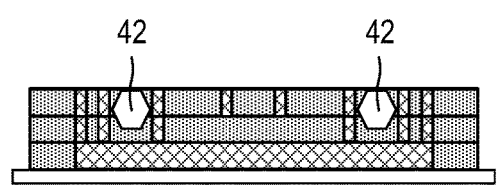

First insert height $h_1$ of first support structures 35 is reached after the completion of third cross-sectional area 13, and hard material particles 42 may be placed within first support structures 35 (FIG. 4G). In the exemplary embodiment, first insert height $h_1$ is greater than maximum diameter $D_{max}$ of hard material particles 42. A first insert height $h_1$, which is greater than maximum diameter $D_{max}$ of hard material particles 42, has the advantage that placed hard material particles 42 are almost completely situated in first support structures 35, and the risk of hard material particles 42 being displaced upon the application of another powder layer is further reduced.

Figure 4H:
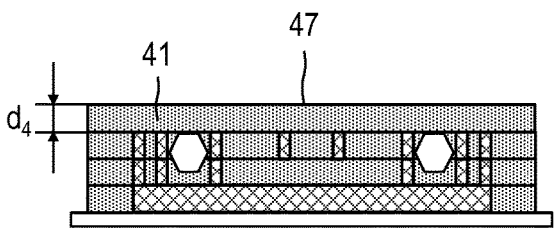
Figure 4I:
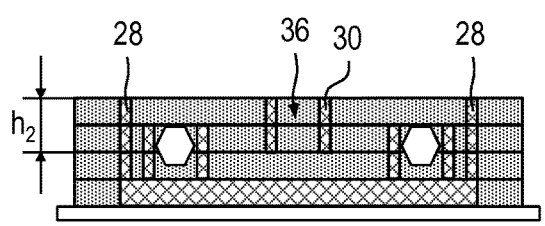
Figure 4J:
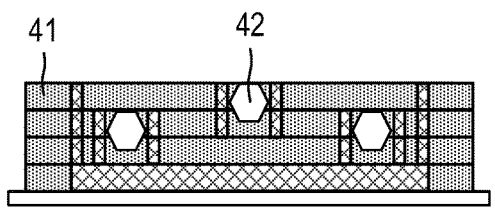

After hard material particles 42 are placed within first support structures 35, the layer construction of first green body 10 continues. A fourth powder layer 47 of powdery material 41 having fourth layer thickness $d_4$ is applied with the aid of the powder feed unit (FIG. 4H). In the area of fourth outer ring 28 and fourth support rings 30, the print head applies adhesive, which bonds the loose powder particles of powdery material 41 to fourth outer ring 28 and fourth support rings 30 (FIG. 4I). Second insert height $h_2$ of second support structures 36 is reached after the completion of fourth cross-sectional area 14, and hard material particles 42 are placed within second support structures 36 (FIG. 4J).

In the exemplary embodiment, first insert height $h_1$ of first support structures 35 and second insert height $h_2$ of second support structures 36 coincide. Alternatively, first and second insert heights $h_1$, $h_2$ may be different. The use of first and second support structures 35, 36 having different insert heights, into which the same type of insert elements is placed, is advantageously useful for green bodies which are further processed into processing segments for abrasive processing tools. In abrasive processing tools, insert elements, which process a substrate or a workpiece, must be exposed on the upper side of the processing segments. For this purpose, the processing segments are usually sharpened until insert elements are exposed on the upper side. The sharpening of the processing segments may be omitted or at least reduced if the insert elements are placed in the area of the upper side in support structures whose height is less than a minimum diameter of the insert elements. During the layer construction, another powder layer is applied after the placement of the insert elements. The thickness of the powder layer may be used to determine whether and to what extent the insert elements protrude on the upper side.

Figure 4K:
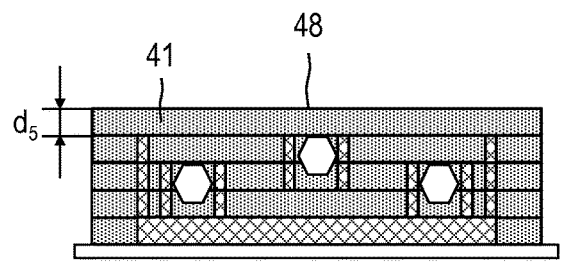
Figure 4L:
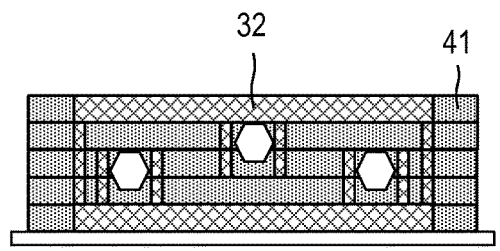
Figure 4M:
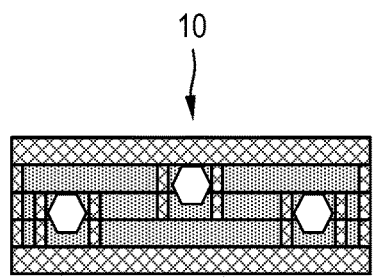

After hard material particles 42 are placed within second support structures 36, the layer construction of first green body 10 continues. A fifth powder layer 48 of powdery material 41 having fifth layer thickness $d_5$ is applied with the aid of the powder feed unit (FIG. 4K). The print head applies an adhesive layer in fifth cross-sectional area 15, which bonds the loose particles of powdery material 41 to cover element 32; loose powder particles of powdery material 41 are situated outside cover element 32 (FIG. 4L). FIG. 4M shows first green body 10 manufactured in layers from powdery material 41, including multiple insert elements 42 arranged in a defined manner.

First green body 10 is manufactured in layers from five material areas 44 through 48 having same powdery material 41. Alternatively, five powder layers 44 through 48 of first green body 10 may be manufactured from different powdery materials 41. In green bodies which are further processed into processing segments for abrasive processing tools, for example a first powdery material may be used for first powder layer 44, and a second powdery material may be used for other powder layers 45 through 48, the properties of the first powdery material being selected with regard to the connection of the processing segments to the base body, and the properties of the second powdery material being selected with regard to the mechanical connection of the insert elements. If the processing segments including the base body are to be welded, a weldable first powdery material is selected.

Figure 5A:
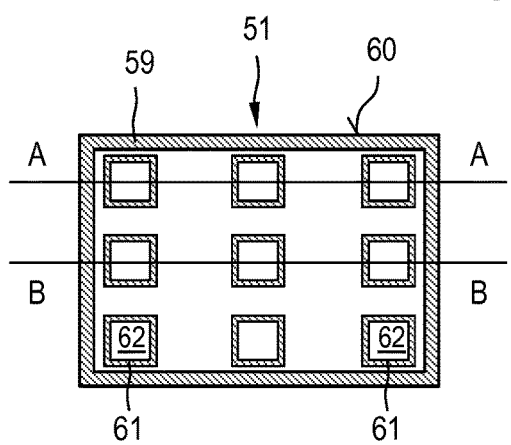
FIGS. 5A through 5E show five cylindrical cross-sectional areas of a second green body, which is constructed on a substrate with the aid of the method according to the present invention for the layered production of a green body.
Figure 5B:
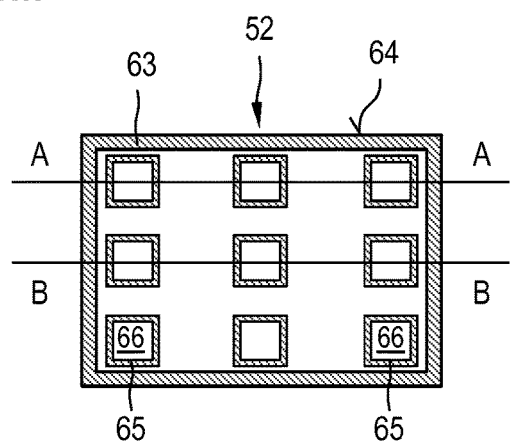
Figure 5C:
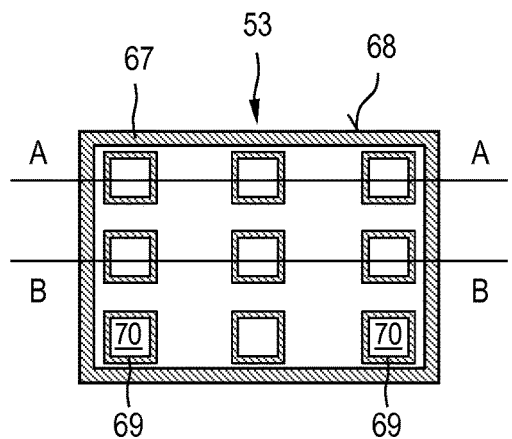
Figure 5D:
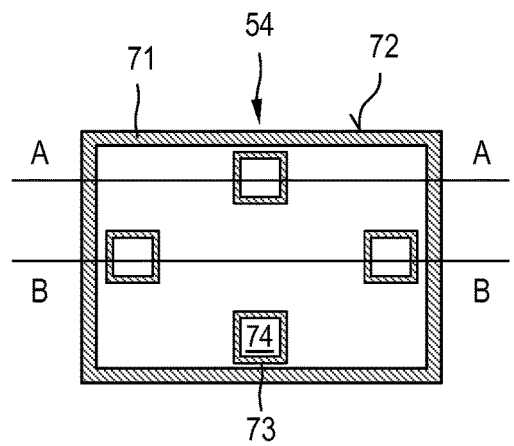
Figure 5E:
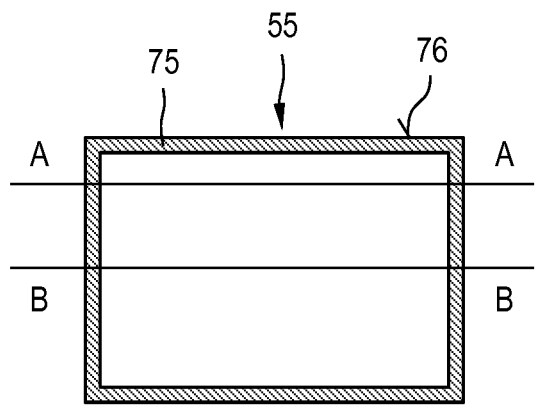

FIGS. 5A through 5E show another green body 50, which is designed as a cuboid and is constructed from five cylindrical cross-sectional areas 51, 52, 53, 54, 55 situated one above the other in a building direction 56 with the aid of the method according to the present invention for the layered production of a green body. FIG. 5A shows first cross-sectional area 51, FIG. 5B shows second cross-sectional area 52, FIG. 5C shows third cross-sectional area 53, FIG. 5D shows fourth cross-sectional area 54, and FIG. 5E shows fifth cross-sectional area 55.

Green body 50 is manufactured from a powdery material 57 and insert elements in the form of cutting elements, which are designed, in particular, as individual hard material particles 42, green body 50 being referred to below as second green body 50. Insert elements 42 are situated in defined positions in second green body 50, the distribution of insert elements 42 coinciding for first and second green bodies 10, 50. While first cross-sectional area 11 forms base element 17 of first green body 10, second green body 50 is constructed on a substrate 58 as the underlying surface. Substrate 58 is, for example, a thin metal plate, which is connected to the base body of an abrasive processing tool in a subsequent processing process. Substrate 58 takes on the function of base element 17 of first green body 10.

First cross-sectional area 51 includes a first outer ring 59 having a first outer lateral surface 60 and first support rings 61, which surround first setting areas 62. Second cross-sectional area 52 includes a second outer ring 63 having a second outer lateral surface 64 and second support rings 65, which surround second setting areas 66. Third cross-sectional area 53 includes a third outer ring 67 having a third outer lateral surface 68 and third support rings 69, which surround third setting areas 70. Fourth cross-sectional area 54 includes a fourth outer ring 71 having a fourth outer lateral surface 72 and fourth support rings 73, which surround fourth setting areas 74. Fifth cross-sectional area 55 includes a fifth outer ring 75 having a fifth outer lateral surface 76.

Outer rings 59, 63, 67, 71, 75 of cross-sectional areas 51 through 55 are designed in the form of a rectangular cylinder and separate second green body 50 from surrounding powdery material 57. In the exemplary embodiment, setting areas 62, 66, 70, 74 have a square design and are surrounded by square support rings 61, 65, 69, 73. Instead of closed, square support rings 61, 65, 69, 73, other closed cross-sectional shapes or non-closed cross-sectional shapes may be used for support rings 61, 65, 69, 73.

Figure 6A:
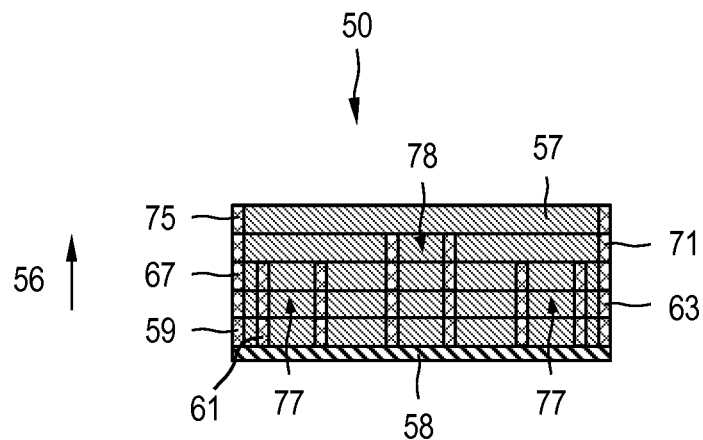
FIGS. 6A, 6B show a first and a second cross section of the second green body in parallel to the building direction along section planes A-A in FIGS. 5A through 5E (FIG. 6A) and along section planes B-B in FIGS. 5A through 5E (FIG. 6B)
Figure 6B:
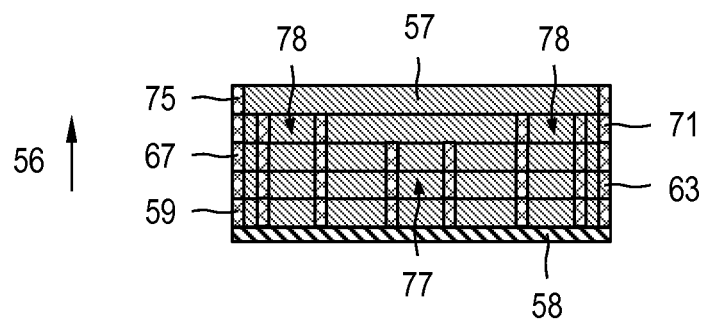

FIGS. 6A, 6B show a first and a second cross section of second green body 50 in parallel to building direction 56 along section planes A-A in FIGS. 5A through 5E (FIG. 6A) and along section planes B-B in FIGS. 5A through 5E (FIG. 6B). Five cylindrical cross-sectional areas 51 through 55 of second green body 50 are situated one above the other in building direction 56.

In the layer construction of second green body 50, an outer geometry is created, which prevents an emergence of powdery material 57 from second green body 50. The outer geometry of second green body 50 is formed by substrate 58 and outer rings 59, 63, 67, 71, 75. Substrate 58 is connected to first outer ring 59, first outer ring 59 is connected to second outer ring 63, second outer ring 63 is connected to third outer ring 67, third outer ring 67 is connected to fourth outer ring 71, and fourth outer ring 71 is connected to fifth outer ring 75.

The outer geometry of second green body 50 in fifth cross-sectional area 55 is designed to be upwardly open, so that second green body 50 must be transported upright for a subsequent compression process. To outwardly delimit second component 50 in fifth cross-sectional area 55 as well, fifth cross-sectional area 55 may alternatively form a cover element, which is connected to fourth outer ring 71. For this purpose, the print head applies an adhesive layer in fifth cross-sectional area 55, which bonds the loose particles of powdery material 57 to the cover element.

Second green body 50 includes five first support structures 77 and four second support structures 78. First support structures 77 are constructed from first, second and third setting areas 62, 66, 70 and have a first insert height $h_1$. Second support structures 78 are constructed from first, second, third and fourth setting areas 62, 66, 70, 74 and have a second insert height $h_2$. First and second support structures 77, 78 are connected to substrate 58 and are fixed securely thereby in second green body 50.

To construct first support structures 77, first support rings 61 are connected to substrate 58, second support rings 65 are connected to first support rings 61, and third support rings 69 are connected to second support rings 65. To construct second support structures 78, first support rings 61 are connected to substrate 58, second support rings 65 are connected to first support rings 61, third support rings 69 are connected to second support rings 65, and fourth support rings 73 are connected to third support rings 69.

Figure 7A:
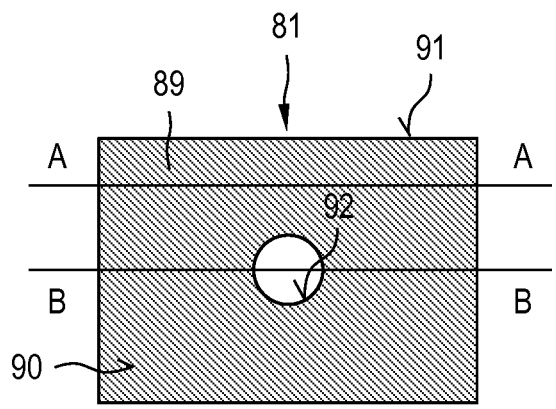
FIGS. 7A through 7E show five cylindrical cross-sectional areas of a third green body, which is designed as a cuboid having an inner recess with the aid of the method according to the present invention for the layered production of a green body.
Figure 7B:
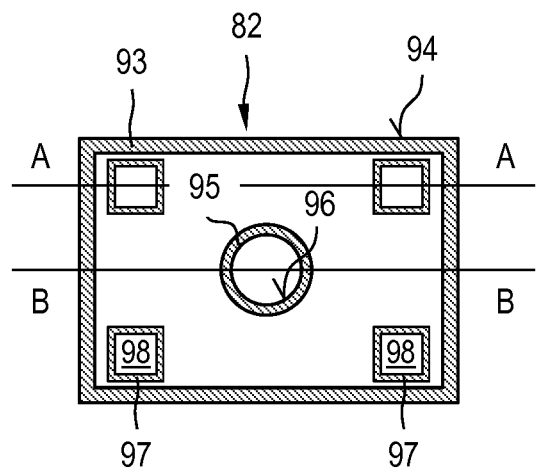
Figure 7C:
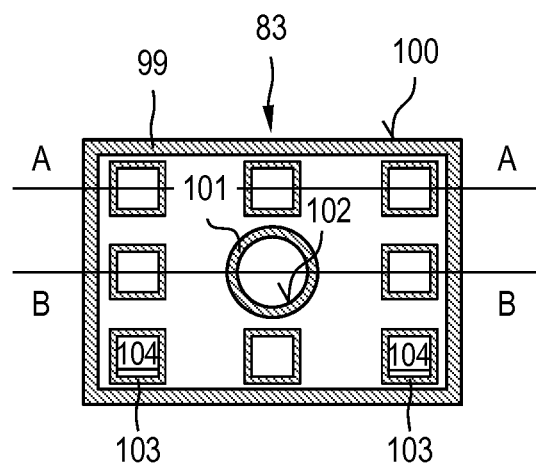
Figure 7D:
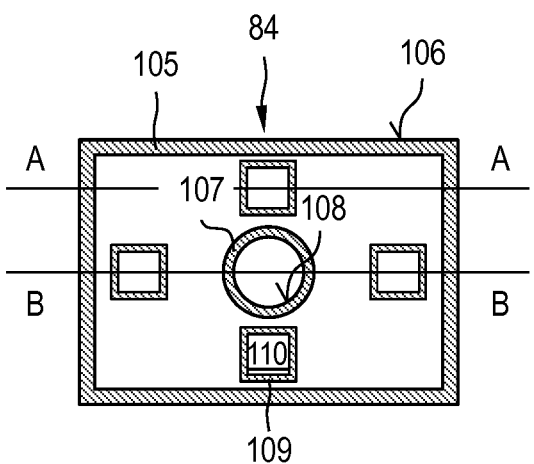
Figure 7E:
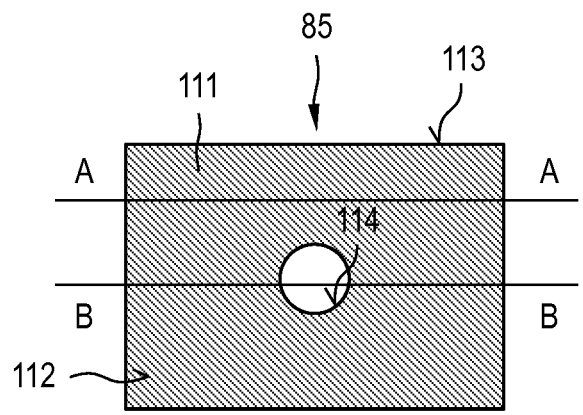

FIGS. 7A through 7E show another green body 80, which is designed as a cuboid having an inner recess, and is constructed from five cylindrical cross-sectional areas 81, 82, 83, 84, 85 situated one above the other in a building direction 86 and made up of a powdery material 87 with the aid of the method according to the present invention for the layered production of a green body. FIG. 7A shows first cross-sectional area 81, FIG. 7B shows second cross-sectional area 82, FIG. 7C shows third cross-sectional area 83, FIG. 7D shows fourth cross-sectional area 84, and FIG. 7E shows fifth cross-sectional area 85.

Green body 80 is referred to below as third green body 80, which differs from first green body 10 in FIG. 1 in that third green body 80 has a continuous inner recess 88 and eight insert elements 42, which are placed at defined positions in third green body 80. Setting areas, which are surrounded by support rings, are defined for insert elements 42 in cross-sectional areas 81 through 85 of third green body 80.

First cross-sectional area 81 forms a base element 89, which includes a base surface 90 corresponding to the first cross-sectional surface of first cross-sectional area 81, and a height corresponding to first layer thickness $d_1$ of first cross-sectional area 81. Base element 89 includes a first outer lateral surface 91 in the form of a rectangular cylinder and a first inner lateral surface 92 in the form of a circular cylinder.

Second cross-sectional area 81 includes a second outer ring 93 having a second outer lateral surface 94, a second inner ring 95 having a second inner lateral surface 96, and four second support rings 97, which surround second setting areas 98. Third cross-sectional area 83 includes a third outer ring 99 having a third outer lateral surface 100, a third inner ring 101 having a third inner lateral surface 102, and eight third support rings 103, which surround third setting areas 104. Fourth cross-sectional area 84 includes a fourth outer ring 105 having a fourth outer lateral surface 106, a fourth inner ring 107 having a fourth inner lateral surface 108, and four fourth support rings 109, which surround fourth setting areas 110.

Fifth cross-sectional area 85 forms a cover element 111, which includes a cover surface 112 corresponding to the fifth cross-sectional surface of fifth cross-sectional area 85, and a height corresponding to fifth layer thickness $d_5$ of fifth cross-sectional area 85. Cover element 111 includes a fifth outer lateral surface 113 in the form of a rectangular cylinder and a fifth inner lateral surface 114 in the form of a circular cylinder.

Figure 8A:
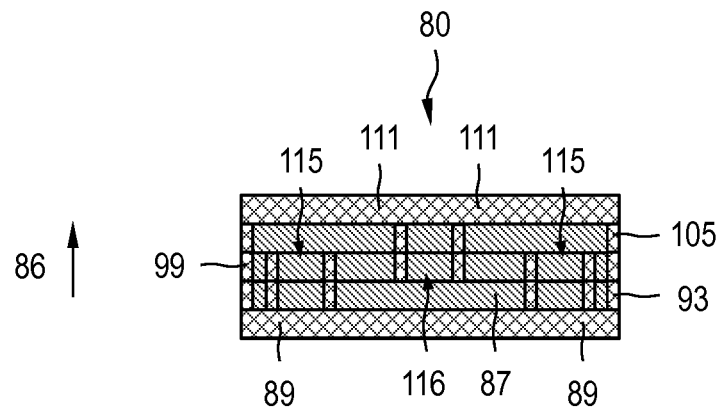
FIGS. 8A, 8B show a first and a second cross section of the third green body in parallel to the building direction along section planes A-A in FIGS. 7A through 7E (FIG. 8A) and along section planes B-B in FIGS. 7A through 7E (FIG. 8B)
Figure 8B:
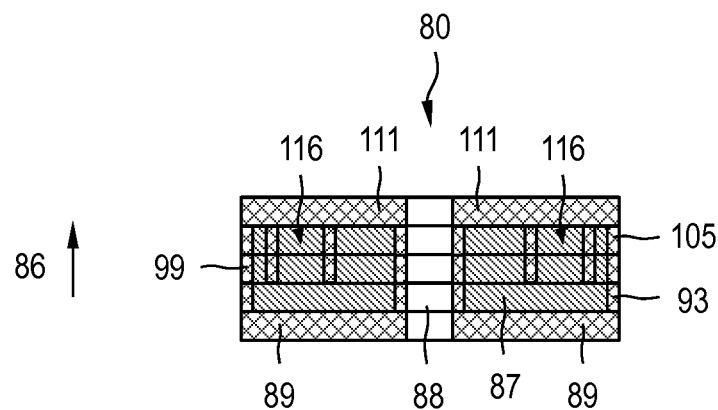

FIGS. 8A, 8B show a first and a second cross section of third green body 80 in parallel to building direction 86 along section planes A-A in FIGS. 7A through 7E (FIG. 8A) and along section planes B-B in FIGS. 7A through 7E (FIG. 8B). Five cross-sectional areas 81 through 85 of third green body 80 are situated one above the other in building direction 86.

In the layer construction of third green body 80, a closed outer geometry is created, which prevents an emergence of powdery material 87 from third green body 80. The closed outer geometry of third green body 80 is formed by base element 89, outer rings 93, 99, 105, inner rings 95, 101, 107 and cover element 111. Outer rings 93, 99, 105 are also referred to as outer limiting rings, and inner rings 95, 101, 107 are also referred to as inner limiting rings, the outer and inner limiting rings being combined under the term "limiting rings." Base element 89 is connected to second limiting rings 93, 95, second limiting rings 93, 95 are connected to third limiting rings 99, 101, third limiting rings 99, 101 are connected to fourth limiting rings 105, 107, and fourth limiting rings 105, 107 are connected to cover element 111.

Third green body 80 includes four first support structures 115 and four second support structures 116. First support structures 115 are formed from second and third setting areas 98, 104 and have a first insert height $h_1$. Second support structures 116 are formed from third and fourth setting areas 104, 110 and have a second insert height $h_2$. FIG. 8A shows two first support structures 115 and one second support structure 116, and FIG. 8B shows two second support structures 116 and recess 88.

First support structures 115 are connected to base element 89, and second support structures 116 are not connected to base element 89. First support structures 115 are fixed in third green body 80 by the connection to base element 89 and are not displaced upon the application of another powder layer. Second insert height $h_2$ of second support structures 116 is adapted only to the dimensions of insert elements 42. If second support structures 116 are sufficiently fixed in powdery material 87 and are not displaced upon the application of another powder layer, this variant has the advantage that the share of adhesive or binding agent in third green body 80 is reduced. In the case that second support structures 116 are not sufficiently fixed in powdery material 87, second support structures 116 may be connected to base element 89. For this purpose, additional first support rings are constructed in first cross-sectional area 81, which are connected to base element 89 and to second support rings of second support structures 116.

Figure 9A:
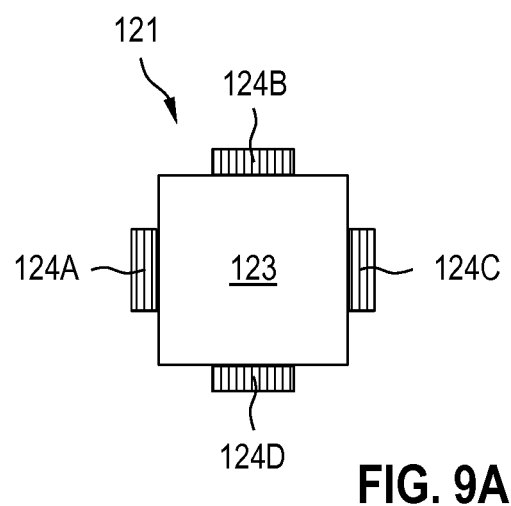
FIGS. 9A, 9B show a first and a second cross-sectional shape for support rings, which surround the setting areas for insert elements.
Figure 9B:
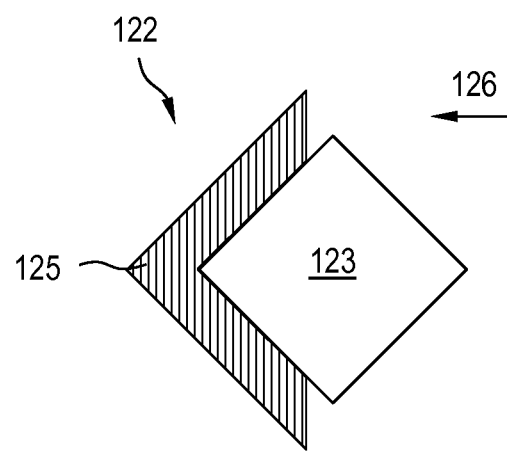

FIGS. 9A, 9B show a first and a second cross-sectional shape for support rings 121, 122, which surround the setting areas for an insert element 123. Support rings 121, 122 may surround setting areas 23, 27, 31 of first green body 10, setting areas 62, 66, 70, 74 of second green body 50 and/or setting areas 98, 104, 110 of third green body 80. Support rings 121, 122 replace support rings 22, 26, 30 of first green body 10, support rings 61, 65, 69, 73 of second green body 50 and/or support rings 97, 103, 109 of third green body 80 and form first and second support structures 35, 36, 77, 78, 115, 116.

FIG. 9A shows support ring 121, which forms a non-closed support structure for insert element 123. Support ring 121 is made up of multiple support sections 124A, 124B, 124C, 124D, which surround insert element 123 and prevent a displacement of insert element 123.

FIG. 9B shows support ring 122, which forms a non-closed support structure for insert element 123. Support ring 122 is made up of a support section 125, which is abutted by insert element 123. Support section 125 is placed in such a way that insert element 123 is secured by support section 125 against displacement upon the application of the next powder layer. For this purpose, support section 125 is situated on the side of insert elements 123 which faces away from application direction 126 of the next powder layer.

What is claimed is:

1. A method for layered production of a green body from powdery material, including insert elements arranged at defined positions in the powdery material, based on three-dimensional data of the green body, the method comprising the steps of:
   segmenting the green body in a building direction into N, N>2, consecutive, cylindrical cross-sectional areas, each of the cross-sectional areas being formed from a two-dimensional cross-sectional surface perpendicular to the building direction and a layer thickness parallel to the building direction;
   applying N powder layers of the powdery material to a building plane perpendicular to the building direction;
   arranging the insert elements at the defined positions in the powdery material;
   defining setting areas for the insert elements in the cross-sectional areas including the defined positions for the insert elements; and
   at least partially bonding the loose powder particles surrounding the setting areas to each other before the insert elements are placed into the powdery material;
   wherein the loose powder particles surrounding the setting areas for the insert elements are bonded to each other in a non-closed support structure.

2. The method as recited in claim 1 wherein the non-closed support structure includes multiple support sections, the support sections being arranged around the insert elements.

3. The method as recited in claim 1 wherein the non-closed support structure includes at least one support section, the support section being situated on a side of the insert elements facing away from the application direction of the next powder layer.

4. The method as recited in claim 1 wherein a base element is defined for a first cross-sectional area of the cross-sectional areas and including a base surface corresponding to a first cross-sectional surface of the first cross-sectional area and having a height corresponding to a first layer thickness of the first cross-sectional area, and the loose powder particles of the powdery material being bonded to each other in the base element.

5. The method as recited in claim 1 wherein a first limiting ring is defined for each cylindrical lateral surface of a first cross-sectional area of the cross-sectional areas, and having a geometry corresponding to a cylindrical lateral surface of the first cross-sectional area and a height corresponding to a first layer thickness of the first cross-sectional area, a first powder layer of the powder layers being applied to a substrate, and the first limiting rings being connected to the substrate.

6. The method as recited in claim 4 wherein support structures are connected to the base element.

7. The method as recited in claim 5 wherein support structures are connected to the substrate.

8. The method as recited in claim 5 wherein a second to Nth-1 limiting ring is defined for each cylindrical lateral surface of the second to Nth-1 cross-sectional area and having a geometry corresponding to the cylindrical lateral surface of the second to Nth-1 cross-sectional area and a height corresponding to a layer thickness of the second to Nth-1 cross-sectional area.

9. The method as recited in claim 8 wherein the loose powder particles of the second to Nth-1 limiting rings are bonded to each other, and the second to Nth-1 limiting rings are each connected to an underlying base element or to the underlying first to Nth-2 limiting rings.

10. The method as recited in claim 8 wherein an Nth limiting ring is defined for each cylindrical lateral surface of the Nth cross-sectional area and has a geometry corresponding to the cylindrical lateral surface of the Nth cross-sectional area and a height corresponding to the Nth layer thickness of the Nth cross-sectional area, the loose powder particles of the Nth limiting rings being bonded to each other, and the Nth limiting rings being connected to the underlying Nth-1 limiting rings.

11. The method as recited in claim 8 wherein a cover element is defined for the Nth cross-sectional area and includes a cover surface corresponding to the Nth cross-sectional surface of the Nth cross-sectional area and a height corresponding to the Nth layer thickness of the Nth cross-sectional area, the loose powder particles of the powdery material being bonded to each other in the cover element, and the cover element being connected to the underlying Nth-1 limiting rings.

* * * * *